United States Patent
Monkhouse et al.

(10) Patent No.: US 9,690,380 B2
(45) Date of Patent: Jun. 27, 2017

(54) CONTEXTUAL HAPTIC FEEDBACK

(71) Applicant: HIWAVE TECHNOLOGIES (UK) LIMITED, Cambridge (GB)

(72) Inventors: Thomas Allan Monkhouse, Cambridge (GB); James John East, Huntingdon (GB)

(73) Assignee: HIWAVE TECHNOLOGIES (UK) LIMITED, Cambridge (GB)

( * ) Notice: Subject to any disclaimer, the term of this patent is extended or adjusted under 35 U.S.C. 154(b) by 162 days.

(21) Appl. No.: 14/350,074

(22) PCT Filed: Oct. 4, 2012

(86) PCT No.: PCT/GB2012/052461
§ 371 (c)(1),
(2) Date: Apr. 6, 2014

(87) PCT Pub. No.: WO2013/050769
PCT Pub. Date: Apr. 11, 2013

(65) Prior Publication Data
US 2015/0153828 A1    Jun. 4, 2015

(30) Foreign Application Priority Data
Oct. 7, 2011  (GB) .................................. 1117321.8

(51) Int. Cl.
*G06F 3/01*    (2006.01)
*G06F 3/044*   (2006.01)

(52) U.S. Cl.
CPC .............. *G06F 3/016* (2013.01); *G06F 3/044* (2013.01)

(58) Field of Classification Search
CPC .. G08B 6/00; G09G 5/00; G06F 3/016; G06F 3/044; G06F 1/163
See application file for complete search history.

(56) References Cited

U.S. PATENT DOCUMENTS

| | | |
|---|---|---|
| 4,885,565 A | 12/1989 | Embach |
| 5,638,060 A | 6/1997 | Kataoka et al. |
| 5,977,867 A | 11/1999 | Blouin |
| 6,219,034 B1 | 4/2001 | Elbing et al. |

(Continued)

FOREIGN PATENT DOCUMENTS

| | | |
|---|---|---|
| EP | 2 124 131 A2 | 11/2009 |
| EP | 2 325 723 A2 | 5/2011 |
| WO | WO 2009/051976 A1 | 4/2009 |

OTHER PUBLICATIONS

International Search Report issued on Dec. 19, 2012 in counterpart International Application No. PCT/GB2012/052461 (2 pages in English).

(Continued)

*Primary Examiner* — Michael Faragalla
(74) *Attorney, Agent, or Firm* — NSIP Law

(57) ABSTRACT

A touch sensitive device for generating contextual haptic feedback comprising a touch sensitive member, a transducer mounted to the member, a processor comprising a control process and a further processing device connected to the processor, the further processing device being adapted to use a context map to enable signals to be provided to the transducer, whereby the transducer can couple vibrational energy to the touch sensitive member to provide haptic feedback.

11 Claims, 9 Drawing Sheets

(56) References Cited

U.S. PATENT DOCUMENTS

| | | | |
|---|---|---|---|
| 7,801,569 B1 | 9/2010 | Zellner | |
| 2002/0075135 A1 | 6/2002 | Bown | |
| 2009/0280860 A1 | 11/2009 | Dahlke | |
| 2009/0289779 A1 | 11/2009 | Braun et al. | |
| 2009/0325647 A1 | 12/2009 | Cho et al. | |
| 2010/0153453 A1* | 6/2010 | Knowles | G06F 17/30867 |
| | | | 707/784 |
| 2010/0156818 A1 | 6/2010 | Burrough et al. | |
| 2010/0171715 A1 | 7/2010 | Peterson et al. | |
| 2010/0188327 A1* | 7/2010 | Frid | G06F 3/016 |
| | | | 345/156 |
| 2010/0214239 A1 | 8/2010 | Wu | |
| 2014/0055358 A1* | 2/2014 | Birnbaum | G06F 3/016 |
| | | | 345/168 |

OTHER PUBLICATIONS

Search Reports issued in counterpart Great Britain Application No. GB 1117321.8 (4 pages in English).

* cited by examiner

CONTEXTUAL HAPTIC FEEDBACK

TECHNICAL FIELD

This invention relates to improvements to haptic feedback, and in particular to improvements to haptic feedback within touch sensitive devices including touch sensitive screens or panels.

BACKGROUND ART

U.S. Pat. No. 4,885,565, U.S. Pat. No. 5,638,060, U.S. Pat. No. 5,977,867, US2002/0075135 describe touch-operated apparatus having tactile feedback for a user when touched.

In U.S. Pat. No. 4,885,565 an actuator is provided for imparting motion to the CRT when the actuator is energised to provide tactile feedback.

In U.S. Pat. No. 5,638,060, a voltage is applied to a piezoelectric element which forms a switch to vibrate the element to apply a reaction force to a user's finger.

In U.S. Pat. No. 5,977,867, a tactile feedback unit generates a mechanical vibration sensed by the user when the touch screen is touched with a finger or a pointer. The amplitude, vibration frequency and pulse length of the mechanical vibration are controlled, with the pulse width being long enough to be felt but short enough to terminate before the next key touch.

US2002/0075135 describes the use of a second transducer to provide a pulse in the form of transient spike to simulate a button click.

BACKGROUND OF THE INVENTION

Haptic feedback relates to touch sensitive feedback, for example haptic feedback may provide a user with additional information regarding a touch event or experience.

One of the earliest forms of haptic feedback related to the servo assisted shake of an aircraft's control column to warn the pilot of a flight situation such as the approach of stall conditions.

Haptic feedback may also be provided within computer games, for example relating to feedback applied to steering wheels, handlebars and joysticks associated with the game being played in order to give feedback to the user. If the computer game being played related to a vehicle race for example the haptic feedback may, in an appropriate situation, be used to indicate that the vehicle has deviated off the desired course onto the side of the track.

Haptic feedback may also be provided for Personal Computer touch pads.

Haptic feedback may be provided for mobile (or cellular) telephones, where the haptic vibration response may be applied in response to a user touching a screen.

Haptic feedback may be provided to give a synthetic 'button click' response equivalent to what a user would anticipate when interacting with a real button. This may relate to providing a button click response on a touch sensitive device in response to a touch on the touch sensitive device. The touch sensitive device may include a touch screen.

To provide a user with information of value the haptic response should mimic what a user would anticipate from interaction with a real system. This means that for the above haptic feedback examples the haptic feedback for a steering wheel associated with a car in a computer game where the car has gone off the course onto the side of the track should represent to the user how a real steering wheel might feel in such a situation, and the haptic feedback for a button click should feel like a real button click to the user. Another way of saying this is that the context of the haptic information relayed to the user is important.

Taking a haptic button click as an example, relaying contextual haptic information may relate to a haptic button click response occurring where the user is expecting it to occur in response to a touch at a touch location and not at another location or locations. Relaying contextual haptic information may relate to the haptic button click response occurring with a magnitude and at a time delay after a touch at a touch location that is representative of a real system in terms of the magnitude of the amplitude of the button click feedback response and the magnitude of the delay between the touch and the haptic button click feedback response and the variability, or lack of variability, in that delay.

Haptic response feedback for a user touching a 'fire' or 'abort' button on a touch sensitive device might be expected to be substantially greater in magnitude to that for a user touching a 'space bar' button on a synthetic keyboard. Contextual haptic feedback would provide the user with the type of feedback information they would expect and want when interacting with these two button click examples.

However, there are problems associated with attempting to provide contextual haptic feedback.

Current touch sensitive haptic feedback systems may comprise a common haptic response that is applied to a touch sensitive screen in response to a touch at any location. All touch events then lead to the provision of the same haptic response. This may provide a fast haptic response to a touch event. This fast response may be provided by a touch controller that is used to gather touch information with this information being relayed to a haptics controller to provide a haptic response, with the haptics controller being disconnected from the control process. A problem associated with this solution is that although a fast haptic response to a touch event is provided, there is no contextual information relayed to the user as the same haptic response occurs across the touch sensitive screen for any touch event. A further problem may be that as a haptic response is being applied to the whole screen the magnitude of the required haptic response may lead to a significant and unwelcome volume of buzz associated with application of the haptic response. A further problem is that the haptic response is disconnected from what is presented on the touch sensitive screen and what is happening in the control process. This may lead to incorrectly interpreted haptic information where the user perceives that the intended touch has been acknowledged, when in fact it may have been incorrectly placed on the touch sensitive screen, or correctly placed but ignored or delayed by the control process. The user may perceive that their intended instruction associated with a touch event is being correctly processed, when another instruction is being processed, or is not being processed as the control process has failed or hung.

Current touch sensitive haptic feedback systems may comprise a control process that is running a touch/haptic user defined application or applications that processes touch information in order to indicate what haptic response is required to correspond with that touch information. A touch controller may be provided that is used to gather touch information, with this touch information being sent to the control process. A haptics controller to provide a haptic response may be provided that receives information from the control process and provides a haptic output to the touch sensitive screen. A problem associated with this is system latency, where there may be a significant and inconsistent time delay between the touch event and the provision of a haptic feedback response to the touch sensitive sensor.

The magnitude and variability of the time delay means that the haptic feedback does not provide the necessary information to the user. The feedback does not feel 'right'. The system is unable to provide contextual haptic feedback.

The present invention was made in an attempt to solve these problems.

SUMMARY OF THE INVENTION

In a first aspect, the invention provides a touch sensitive device for generating contextual haptic feedback, the device comprising:
a touch sensitive member;
at least one transducer mounted to the member;
a processor comprising a control process;
at least one further device connected to the processor;
one of the at least one further device being adapted to use a context map to enable signals to be provided to the at least one transducer, whereby the at least one transducer can couple vibrational energy to the touch sensitive member to provide haptic feedback.

In a second aspect, the invention provides a touch sensitive device for generating contextual haptic feedback, the device comprising:
a touch sensitive member;
at least one transducer mounted to the member;
a processor comprising a control process;
the control process being adapted to implement a context map at a low level within the control process;
wherein the low level within the control process is adapted to use the context map to enable signals to be provided to the at least one transducer, whereby the at least one transducer can couple vibrational energy to the touch sensitive member to provide haptic feedback.

In a third aspect, the invention provides a touch input device for generating contextual haptic feedback, the input device comprising:
a touch sensitive member;
at least one transducer mounted to the member;
electrical circuits adapted to produce a digital or analogue output in response to a touch input;
at least one device connected to the electrical circuits;
one of the at least one device being adapted to use a context map to enable signals to be provided to the at least one transducer, whereby the at least one transducer can couple vibrational energy to the touch sensitive member to provide haptic feedback.

BRIEF DESCRIPTION OF DRAWINGS

The prior art is diagrammatically illustrated and the invention is diagrammatically illustrated, by way of example, in the accompanying drawings in which:—

DETAILED DESCRIPTION

In making the present invention it has been determined that the problems of latency in touch sensitive devices providing haptic feedback largely relate to the control process, and its systems architecture. Control processes may typically take the form of an Operating System. A typical Operating System is highly modular and may comprise two main layers: a user mode; and a kernel mode. User run programs or applications such as the touch/haptic user defined application run in the user mode, along with numerous other applications. User run applications may only be able to access system resources via the Executive dealing with Input/Output, object and process management and many other processes running in kernel mode. A pyramid structure exists with Systems Hardware, such as Input/Output devices including the touch and haptics controllers, sitting at the bottom of the pyramid. On top of the Systems Hardware sits the kernel mode running the Executive. On top of the kernel mode sits the User mode running the User defined applications. Accordingly, in operation, touch information gathered by the touch controller must pass up from the hardware layer through the pyramid to the touch/haptic user defined application, during which passage other system processes being undertaken by the Operating System may lead to a significant and variable time delay. The touch information may or may not include the touch location on the touch sensitive screen. The touch/haptic user defined application will incur a variable time delay dependent upon how quickly the touch location on the touch sensitive screen can be determined if so required, and will incur a variable time delay relating to processing of the touch information to determine a necessary haptic response. Once processed by the touch/haptic user defined application, information necessary to provide a haptic output must percolate back down through the pyramid, again incurring a significant and variable time delay, to the haptics controller that can then proceed to generate the appropriate haptic output to the touch sensitive screen. This means that there may be a significant and inconsistent time delay between the touch event and the provision of a haptic feedback response to the touch sensitive sensor.

Figure 1:
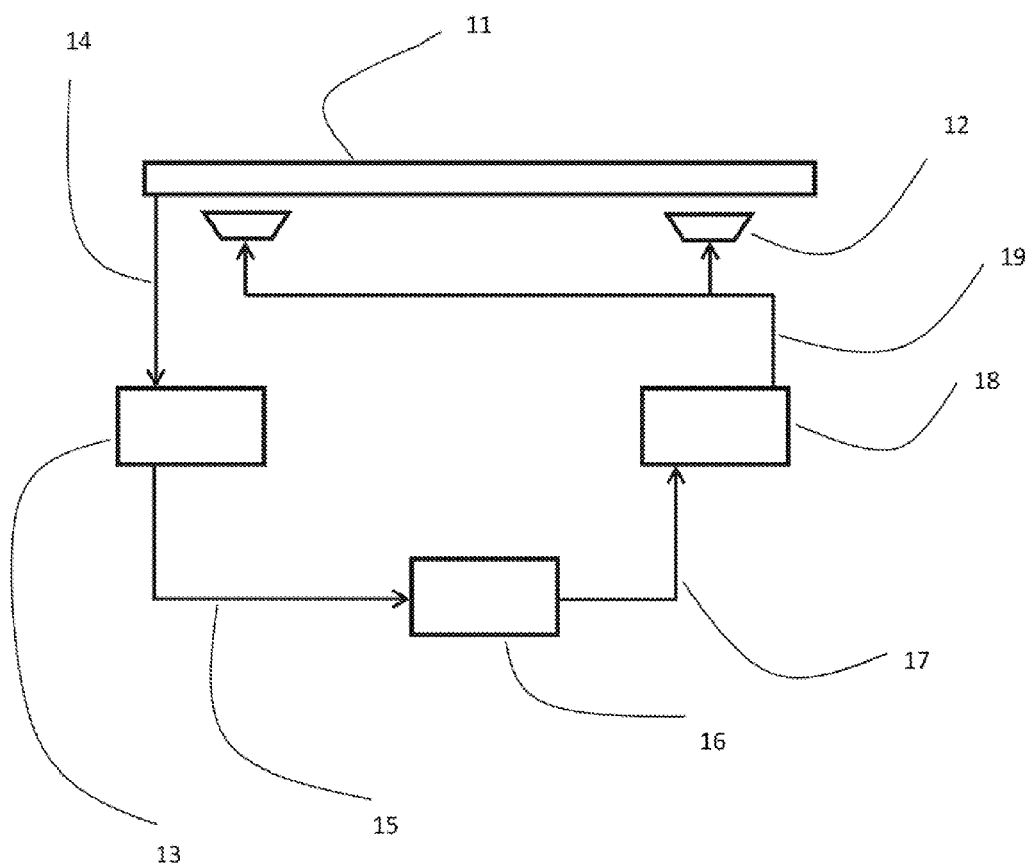
FIG. 1 shows a schematic diagram of a prior art touch sensitive device comprising haptic feedback.

FIG. 1 shows a schematic diagram of a prior art touch sensitive device 1 comprising haptic feedback. The device 1 includes a touch sensitive screen 11 having one or more exciters 12 coupled to it to vibrate the touch sensitive screen 11 to provide a haptic feedback response. A touch controller 13 collects touch data 14 from the touch sensitive screen 11 and sends touch information 15 to a control process 16. The control process 16 processes the touch information and provides haptics request information 17 to a haptics controller 18. The haptics controller 18 may apply appropriate algorithms to the haptics request information to generate haptic response information, which may typically take about 10 ms, and sends the haptic response information 19 to the one or more exciters 12 to provide haptic response feedback.

As discussed above, a problem associated with prior art touch sensitive devices relates to the control process 16, and its systems architecture, which can lead to significant and variable time delays in the provision of haptic response feedback.

Figure 2:
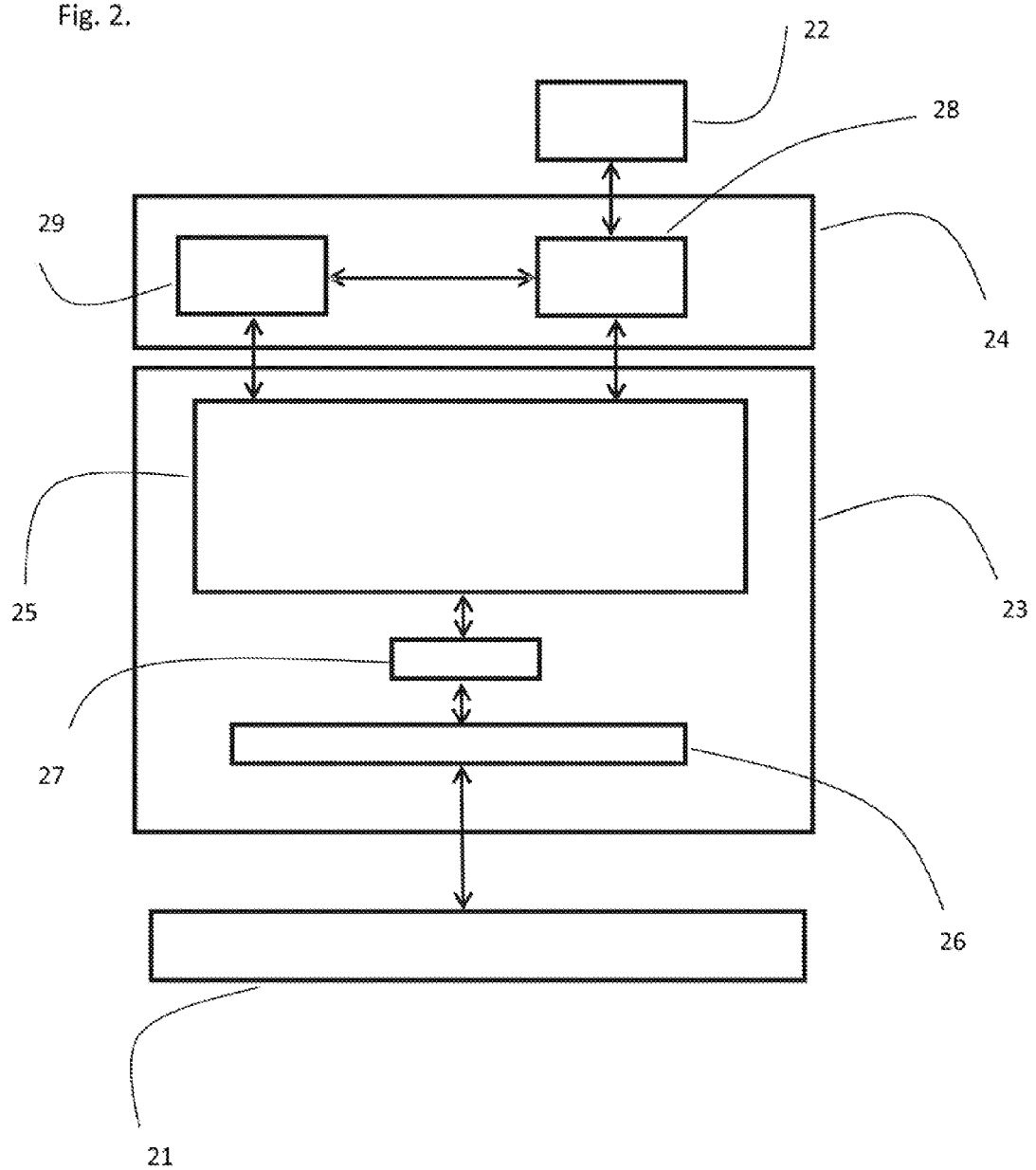
FIG. 2 shows a schematic diagram of an operating system.

A control process may take the form of an Operating System. FIG. 2 shows a schematic diagram of an operating system, showing the layers that exist between hardware 21 such as input and output devices, and applications 22 such as a user defined touch/haptic application. A typical Operating System comprises two main layers, a kernel mode 23 and a user mode 24. The kernel mode 23 comprises an executive 25 that deals with input/output, object and process management and many other processes running in the kernel mode 23. Hardware 21 such as input/output may interact with a hardware abstraction layer 26 within the kernel mode 23, with the hardware abstraction layer 26 interfacing with the executive 25 via kernel mode drivers and/or a microkernel 27. The executive 25 interacts with environmental subsystems 28 and integral subsystems 29 within the user mode 24. The integral subsystems 29 deal with system aspects such as security and server access on behalf of the environmental subsystem 28. The environmental subsystem 28 runs user defined applications 22.

Touch information 15 gathered by the touch controller 13 and sent to the Operating System to be processed by the user defined touch/haptic application 22 must pass up through the different layers of the Operating System before it can be acted upon, during which time other systems processes being undertaken by the Operating System, which share operating system resources with the user defined touch/haptic application 22, may lead to delay in that passage, and so lead to a significant and variable time delay in the time taken for the information to be processed.

The user defined touch/haptic application 22 may be required to determine the location of a touch event on the touch sensitive screen 11. The touch location may be at any one of a number of possible touch locations and identifying the actual touch location from the different possibilities may incur a variable time delay dependent upon how quickly the touch location on the touch sensitive screen can be determined.

Once the touch location has been identified on the touch sensitive screen 11 by the user defined touch/haptic application 22, and the user defined touch/haptic application 22 has determined what haptics request information 17 is to be sent to the haptics controller 18 the haptics request information 17 must pass back through the different layers of the Operating System, again incurring a significant and variable time delay for the same reasons as before. Only when the haptics controller 18 receives the haptics request information from the Operating System can the haptics controller 18 begin to generate an appropriate haptic output to the touch sensitive screen 11.

This means that there may be a significant and inconsistent time delay between the touch event and the provision of a haptic feedback response to the touch sensitive screen 11. The magnitude and variability of that time delay means that the haptic feedback does not provide the necessary information to the user. Research by the applicant has shown that the time delay between a touch event and the provision of a haptic feedback response may vary by a very large margin, for example between 20 ms and 200 ms for a particular touch event, and other touch events may show delays of up to 500 ms between the touch event and the provision of a haptic feedback response. The result for prior art haptic feedback systems is that the feedback does not feel 'right' to the user. Furthermore the prior art haptic feedback system is unable to provide reliable contextual haptic feedback.

An alternative prior art system has the touch controller connected directly to the haptics controller to provide common haptic feedback across the whole touch screen in response to a touch at any location. In this alternative the haptics controller is not connected to the operating system 16, but is connected directly to the touch controller.

A problem with this approach is that a common response is applied across the touch screen in response to any touch, so that the haptic information provided is not contextual.

Another problem is that as the haptic response is disconnected with what is presented on the touch sensitive screen and what is happening in the control process, haptic information may be incorrectly interpreted.

The present invention attempts to solve these problems and provides a touch sensitive device providing reliable contextual haptic feedback, and a method for providing reliable contextual haptic feedback.

Figure 3:
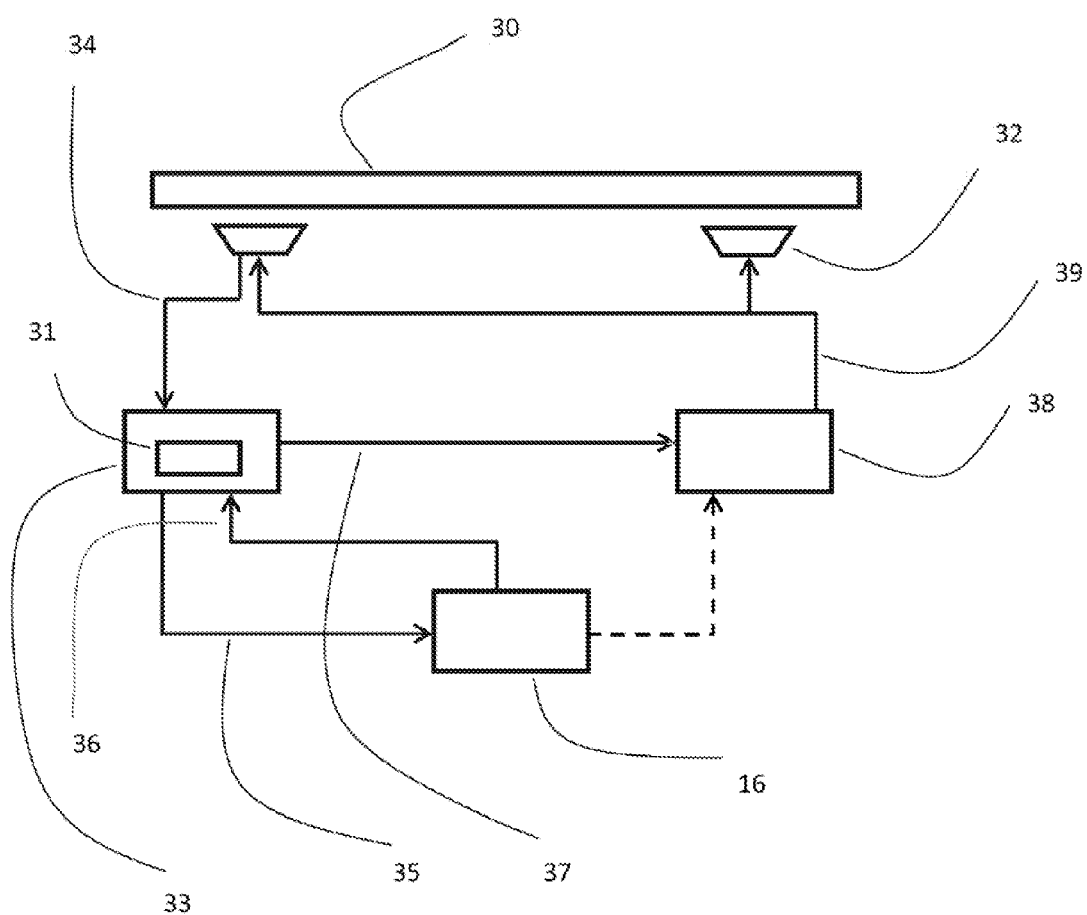
FIG. 3 shows a schematic diagram of a touch sensitive device comprising haptic feedback according to a first embodiment of the present invention.

FIG. 3 shows a schematic diagram of a first embodiment of a touch sensitive device 3 comprising haptic feedback according to the present invention. The touch sensitive device 3 comprises a touch sensitive sensor or member 30 having one or more exciters or transducers 32 coupled to it which are able to vibrate the touch sensitive sensor 30 in order to provide haptic feedback response.

A touch on the touch sensitive sensor or member 30 at a location leads to the production of touch data 34.

A touch controller 33 collects the touch data 34 from the touch sensitive sensor or member 30. The touch controller 33 processes the touch data 34 and determines the location of the touch on the touch sensitive sensor or member 30.

In order to provide contextual haptic response feedback the touch location on the touch sensitive sensor or member 30 is correlated with active areas associated with the interface the user is interacting with (for example a set of keys in one layer of series of layers within menu screens). In order to do this it must be determined which area has been touched (for example which key or keys have been touched). In other words, the location of the touch must be determined in relation to the locations of the active areas. It must then be determined what contextual haptic response is required in relation to the touching of that area. Contextual haptic response feedback could be a null response, for example if the touch was outside the bounds of the active areas presented to the user, or could be a localised haptic response of different amplitude or magnitude at the touch location or locations.

In some examples the active areas may correspond to icons displayed in the interface. In some examples the active areas may correspond to virtual keys displayed in the interface.

Contextual haptic response feedback may include static or dynamic clicks or textures in response to a touchdown in or movement across an active area, for example.

Haptic response in the form of textures is a haptic response varying over time so as to produce an apparent sensation of texture to a user touching an area subject to the haptic response.

Contextual haptic response feedback may include vibration across the whole touch sensitive sensor or member, for example if the winning move in a game has been made.

A context map 31 is stored on the touch controller 33. The context map 31 contains the information required to generate contextual haptic decision information. The context map 31 contains a representation of the interface the user interacts with on the touch sensitive sensor or member, with information relating to what, if any, contextual haptic response is required for a touch on the touch sensitive sensor or member 30. This means that the touch location is correlated with the corresponding contextual haptic response by the context map 31. In the present invention haptic decision information may include any of: haptic response information or haptics request information.

The touch location is correlated with the context map 31, which describes the appropriate decision information for each active area. This description may take the form of an R Tree, which defines a number of rectangular areas. Each active area within the interface presented to the user corresponds with one rectangle. Rectangles can be defined by bounds such as four numbers that translate easily into 2D mapping (left/upper edges and either width/height or right/lower edges—other means for defining rectangles will be appreciated by the person skilled in the art). The defined rectangles may overlap. The rectangles are arranged in a nested hierarchy in which each rectangle comprises further rectangles, and each further rectangle comprises further rectangles, down to a resolution when a touch location can be unambiguously assigned to an area within the interface presented to the user on the touch sensitive sensor or member based upon an identification of which rectangles the touch location lies within. Thus, the rectangles are nested within each other. For example a touch location could be associated with one of the larger top layer rectangles making up the context map, and then be associated with one of the smaller rectangles nested within that rectangle, and then finally with one of the smallest rectangles nested within that smaller nested rectangle, where the smallest rectangle corresponds unambiguously to one icon within the touch imagery presented to the user. The layout of the rectangles and the layout of the nested rectangles is generated by a Rectangle Tree Algorithm, such as an R* tree algorithm.

The context map may include further information relating to an active area or group of active areas. This extra context information may include but is not limited to factors such as signal amplitude and profile choice, additional algorithms to be applied, audio cues to be played, gestures to be recognised, velocity profiles to be analysed, and thresholds for parameters other than location, such as duration of touch, or force sensing. The extra context information may comprise a simple on/off toggle, allowing the haptic response to be selectively activated or deactivated without deleting the context map.

When the touch location has been assigned to or correlated with one active area presented to the user the required contextual haptic feedback can be provided.

The touch controller 33 processes the touch data 34 to produce touch information 35 which it sends to a control process 16. The touch information 35 includes the touch location on the touch sensitive sensor or member 30.

The control process 16 provides haptic context information 36 to the touch controller 33. If the interface presented to the user changes, for example if the user enters a new menu screen, the required context map 31 may be different to the previous context map 31 because the icon layout presented to the user has changed, and as a result the contextual haptic response feedback required in response to a touch on the touch sensitive sensor or member 30 at a position associated with an area within the interface may have changed. In certain circumstances the context map 31 may need to be updated or replaced. This is carried out under the control of the control process 16. Accordingly, context information 36 sent from the control process 16 may include context map replacement or context map update information if required.

The touch controller 33 also processes the touch data 34 using the context map 31 to produce haptics request information 37, and sends the haptics request information to a haptics controller 38. The haptics request information 37 includes information indicating where on the touch sensitive sensor or member 30 a touch occurred and includes information indicating what contextual haptic response is required in response to a touch at a location or locations on the touch sensitive sensor or member 30.

The haptics controller 38 processes the haptics request information 37 to generate haptic response information 39 that is sent to the one or more exciters or transducers 32 coupled to the touch sensitive sensor or member 30 to vibrate the touch sensitive sensor or member 30 in order to provide contextual haptic feedback response.

The haptic response information 39 is generated through the application of appropriate algorithms. The appropriate algorithm may include the selection of an appropriate previously calculated signal, or the implementation of filters to generate an appropriate signal. The previously calculated signals or the filters may be stored within the haptics controller 38. The appropriate filter may be a time-reversal filter, a simultaneous multi-region filter or an infinite impulse response filter, or any other appropriate filter known in the art.

Accordingly, haptic response information 39 can be provided to the exciters or transducers 32 in order that contextual haptic feedback can be generated without the need for the control process 16 to be used to carry out any processing. This may allow the time delay between a touch event and the provision of a contextual haptic feedback response to be reduced. In some examples the time delay may be reduced to the order of 10 ms for a particular touch event.

In the above embodiment the context map 31 is stored on the touch controller 33, and may be updated by the control process 16. Alternatively, more than one context map 31 may be stored on the touch controller 33. Alternatively, the at least one context map 31 may be uploaded to the touch controller 33 from the control process 16. In a further alternative the context map 31 may be replaced by another context map 31 when necessary. The at least one context map 31 may be uploaded, updated, and/or replaced under the control of a user defined application.

In the above embodiment the touch information 35 sent from the touch controller 33 to the control process 16 includes the touch location on the touch sensitive sensor or member 30. Alternatively the touch information 35 may not include the touch location on the touch sensitive sensor or member 30.

In the above embodiment the haptics request information 37 includes information indicating where on the touch sensitive sensor or member 30 a touch occurred. In an alternative embodiment, the haptics request information does not include information indicating where on a touch sensitive sensor or member 30 a touch occurred and the haptics controller 38 can process the haptics request information to determine the touch location on the touch sensitive member 30. In an alternative embodiment, the haptics request information does not include information indicating where on a touch sensitive sensor or member 30 a touch occurred, and the haptics controller 38 may determine the touch location on the touch sensitive member 30 using other available data, or alternatively may not determine the touch location.

In the above embodiment when the touch location can be assigned or correlated with one active area presented to the user the required contextual haptic feedback can be provided. However, it is possible that more than one area may be touched at one time or that a touch may occur at a location other than the location of any defined areas, or is otherwise ambiguous. In such circumstances the touch at more than one location may be correlated with more than one area. The required contextual haptic feedback may also be a null response in such cases. It is also possible that touch locations may be assigned or correlated with more than one defined area presented to the user leading to the provision of required contextual haptic feedback, one example being the pressing of Ctrl, Alt and Delete at the same time on a synthesised keyboard.

In the above embodiment haptic response information 39 is generated through the application of appropriate algorithms. The appropriate algorithms or related resources may include a selection of signals or filters stored within the haptics controller 38. Alternatively, only some of the appropriate algorithms or related resources may be stored on the haptics controller 38. Alternatively, the haptics controller 38 may have none or some of the appropriate algorithms or related resources stored on it and may generate all or some of the required algorithms or related appropriate resources using calculation information stored on the haptics controller 38. Alternatively the appropriate algorithms or related resources may be uploaded to the haptics controller 38. Alternatively the calculation information may be uploaded to the haptics controller 38.

Optionally, the control process 16 may be in communication with the haptics controller 38. This will allow the control process 16 to be able to monitor what the haptics controller 38 is doing, if desired. Further, this will allow the control process 16 to upload information to the haptics controller 38 if necessary.

An alternative embodiment to that discussed above is where the control process 16 is in communication with the haptics controller 38 and the control process 16 may send to the haptics controller 38 some or all of the appropriate resources if necessary, in order that haptics request information 37 can be processed by the haptics controller 38 to provide the necessary haptic response information 39.

In an alternative embodiment to that discussed above the control process 16 may be in communication with the haptics controller 38 and the control process 16 may send to the haptics controller 38 some or all of the calculation information in order that the haptics controller 38 may generate the appropriate resources, in order that haptics request information 37 may be processed by the haptics controller to provide the necessary haptic response information.

In the above embodiment the control process 16 is in communication with the touch controller 33 to provide context information 36. Further, this will allow the control process 16 to upload other information to the touch controller 33 if necessary.

As discussed above the context map 31 stored on or uploaded to the touch controller 33 may be updated or changed by the control process 16 or an active application when the layout on the touch sensitive sensor or member 30 changes. The latency problem in providing a haptic response does not usually apply to the same extent when updating a context map because the user is generally not awaiting or expecting the immediate response that is expected for a haptic response. In general, the context map may be updated without any significant decrease in the performance of the system. Furthermore, use of the context map may allow for the support of greater detail in the contextual information provided to the user, such as different threshold levels for the click response for different buttons, the selection of different haptic responses for different buttons, and the selection of different magnitudes of response for different buttons, for example.

Figure 4:
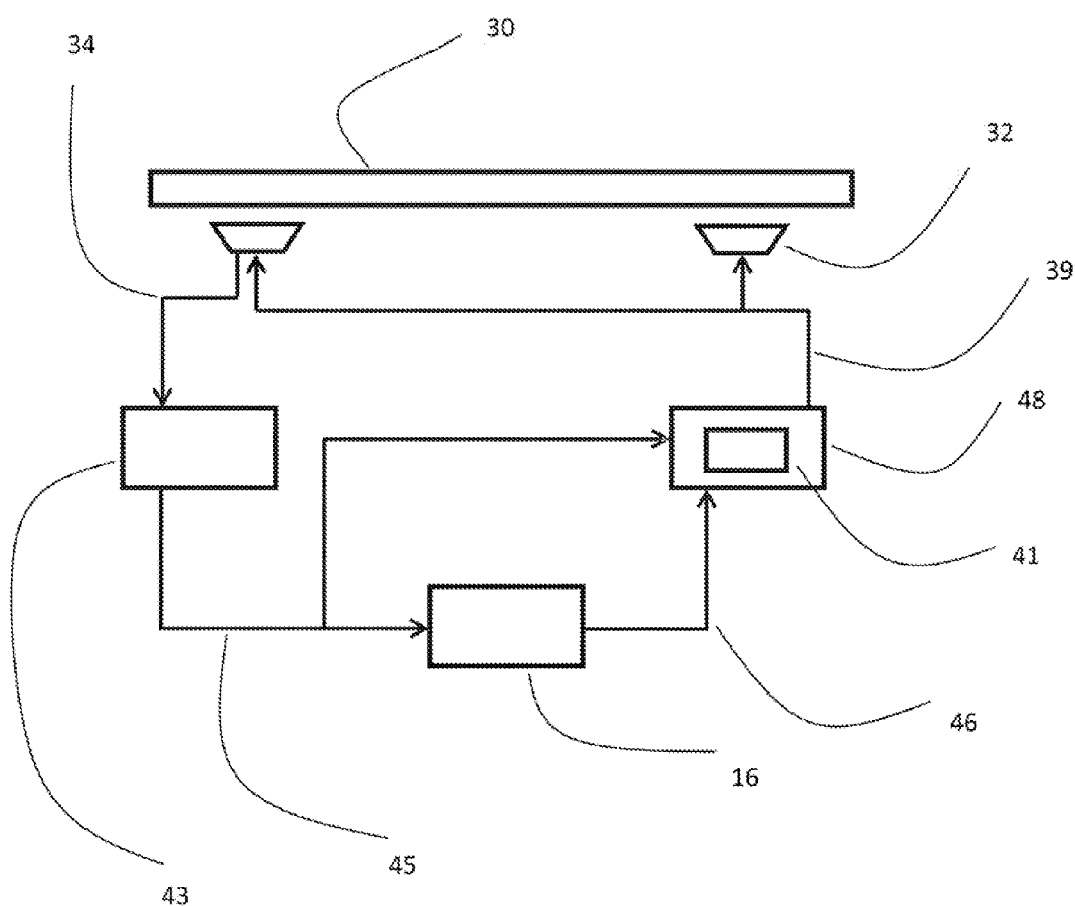
FIG. 4 shows a schematic diagram of a touch sensitive device comprising haptic feedback according to a second embodiment of the present invention.

FIG. 4 shows a schematic diagram of a second embodiment of a touch sensitive device 4 comprising haptic feedback according to the present invention. The touch sensitive device 4 comprises a touch sensitive sensor or member 30 having one or more exciters or transducers 32 coupled to it which are able to vibrate the touch sensitive sensor 30 in order to provide haptic feedback response.

A touch on the touch sensitive sensor or member 30 at a location leads to the production of touch data 34.

A touch controller 43 collects the touch data 34 from the touch sensitive sensor or member 30. The touch controller processes the touch data 34 and determines the location of the touch on the touch sensitive sensor or member 30.

The touch controller 43 processes the touch data 34 to produce touch information 45 and sends the touch information 45 to a control process 16 and to a haptics controller 48. The touch information includes the touch location on the touch sensitive sensor or member 30.

In the embodiment of FIG. 4, the same touch information 45 is sent to the control process 16 and to the haptics controller 48 by the touch controller 43. Accordingly, in some examples the touch controller 43 may process and send the touch information 45 in the same manner as if the haptics controller 48 was not present and the touch information 45 was being provided to only the control process 16. In some examples this may allow the present invention to be added to pre-existing devices without any changes to the touch controller being required.

In order to provide contextual haptic response feedback the touch location on the touch sensitive sensor or member 30 is correlated with active areas in the interface the user is interacting with in the manner as explained in the detailed description of the embodiment shown in FIG. 3.

In the embodiment of FIG. 4, a context map 41 is stored on the haptics controller 48. The context map 41 contains the information required to generate contextual haptic decision information, as explained in the detailed description of the embodiment shown in FIG. 3.

The touch location is correlated with the context map 41, which defines a number of active areas in the manner as explained in the detailed description of the embodiment shown in FIG. 3.

When the touch location has been assigned to or correlated with one active area presented to the user the required contextual haptic feedback can be provided.

The control process 16 provides haptic context information 46 to the haptics controller 48, with what this information constitutes and why it may need to be sent as explained in the detailed description of the embodiment shown in FIG. 3.

The haptics controller 48 processes the touch information 45 using the context map 41 and determines what contextual haptic response is required in response to a touch at a location or locations on the touch sensitive sensor or member 30.

The haptics controller 48 processes the touch information 45 to generate haptic response information 39 that is sent to the one or more exciters or transducers 32 coupled to the touch sensitive sensor or member 30 to vibrate the touch sensitive sensor or member 30 in order to provide contextual haptic feedback response.

The haptic response information 39 is generated through the application of appropriate algorithms stored within the haptics controller, as explained in the detailed description of the embodiment shown in FIG. 3.

Accordingly, haptic response information 39 can be provided to the exciters or transducers 32 in order that contextual haptic feedback can be generated without the need for the control process 16 to be used to carry out any processing. This may allow the time delay between a touch event and the provision of a contextual haptic feedback response to be reduced and/or made consistent. In some examples the time delay may be reduced to the order of 10 ms for a particular touch event.

In the above embodiment the context map 41 is stored on the haptics controller 48, and may be updated by the control process 16. Alternatively, options relating to the algorithms are possible as explained in the detailed description of the embodiment shown in FIG. 3

In the above embodiment the touch information 45 sent from the touch controller 43 to the control process 16 and to the haptics controller includes the touch location on the touch sensitive sensor or member 30. Alternatively the touch information 45 does not include the touch location on the touch sensitive sensor or member 30 and the haptics controller 48 can process the touch information 45 to determine the touch location on the touch sensitive member 30.

In the above embodiment when the touch location can be assigned or correlated with one active area presented to the user the required contextual haptic feedback can be provided. However, there are other possibilities as explained in the detailed description of the invention shown in FIG. 3.

In the above embodiment haptic response information 39 is generated through the application of appropriate algorithms. The appropriate algorithms may include the selection of pre-generated signals or filters stored within the haptics controller 48. Alternatively, only some of the appropriate algorithms or related resources may be stored on the haptics controller 48. Alternatively, the haptics controller 48 may have none or some of the appropriate algorithms or related resources stored on it and may generate all or some of the required appropriate algorithms or related resources using calculation information stored on the haptics controller 48. Alternatively the appropriate algorithms or related resources may be uploaded to the haptics controller 48. Alternatively the calculation information may be uploaded to the haptics controller 48.

In the above embodiment the control process 16 is in communication with the haptics controller 48 to provide haptic context information 46. This will also allow the control process 16 to be able to monitor what the haptics controller 48 is doing, if desired. Further, this will allow the control process 16 to upload information to the haptics controller 48 if necessary. In alternative embodiments the control process may not be in communication with the haptics controller.

In the above embodiment the touch controller 43 is in communication with the control process 16 to provide touch information 45. Optionally, the control process 16 may also be arranged to upload information to the touch controller 43 if necessary.

An alternative embodiment to that discussed above is that the control process 16 is in communication with the haptics controller 48 and the control process system 16 may send to the haptics controller 48 some or all of the appropriate resources if necessary, in order that touch information 45 can be processed by the haptics controller 48 to provide the necessary haptic response information 39.

An alternative embodiment to that discussed above is where the control process 16 is in communication with the haptics controller 48 and the control process 16 may send to the haptics controller 48 some or all of the calculation information in order that the haptics controller 48 may generate the appropriate resources, in order that touch information 45 may be processed by the haptics controller to provide the necessary haptic response information.

As discussed above the context map 41 stored on or uploaded to the haptics controller 48 may be updated or changed by the control process 16 or an active application when the layout on the touch sensitive member 30 changes. The latency problem in providing a haptic response does not usually apply to the same extent when updating a context map because the user is not awaiting or expecting the immediate of response that is expected for a haptic response. In general, the context map may be updated without any significant decrease in the performance of the system. Furthermore use of the context map may allow for the support of greater detail in the contextual information provided to the user, such as different threshold levels for the click response for different buttons, the selection of different haptic responses for different buttons, and the selection of different magnitudes of response for different buttons, for example.

Figure 5:
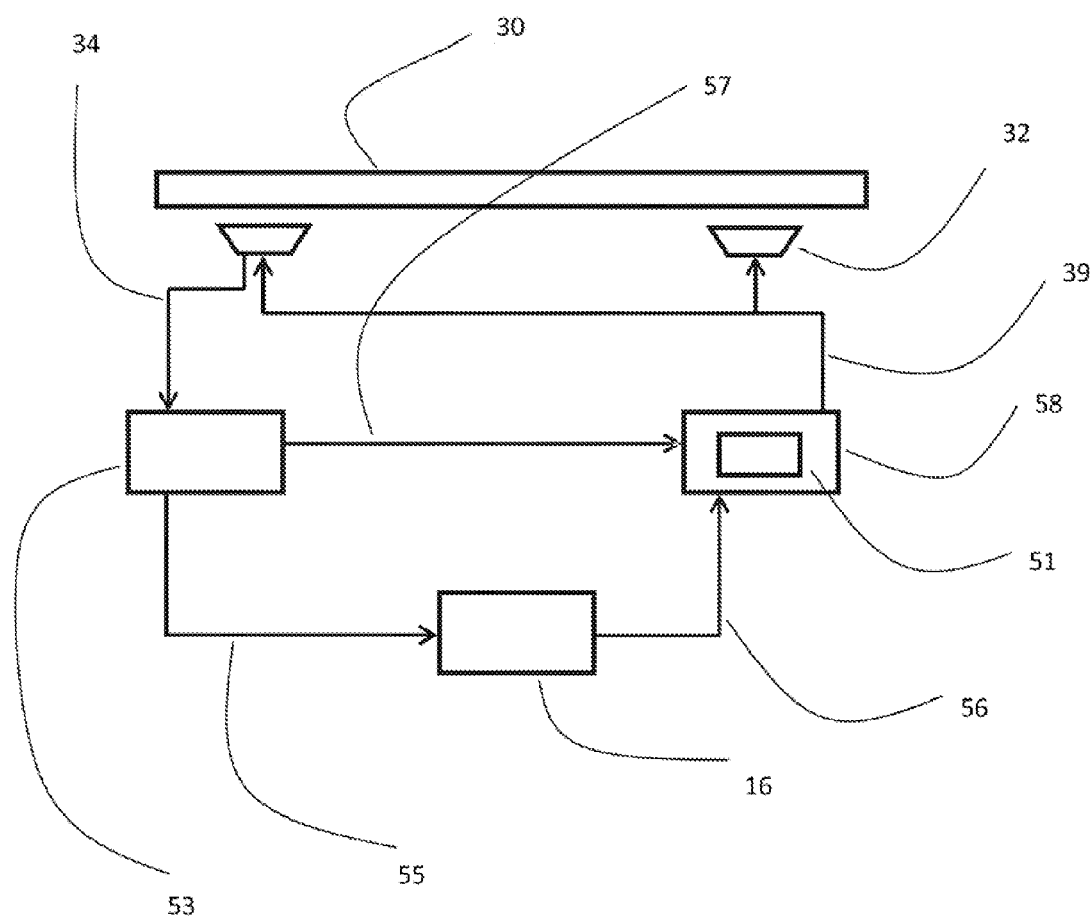
FIG. 5 shows a schematic diagram of a touch sensitive device comprising haptic feedback according to a third embodiment of the present invention.

FIG. 5 shows a schematic diagram of a third embodiment of a touch sensitive device 5 comprising haptic feedback according to the present invention. The touch sensitive device 5 comprises a touch sensitive sensor or member 30 having one or more exciters or transducers 32 coupled to it which are able to vibrate the touch sensitive sensor 30 in order to provide haptic feedback response.

A touch on the touch sensitive sensor or member 30 at a location leads to the production of touch data 34.

A touch controller 53 collects the touch data 34 from the touch sensitive sensor or member 30. The touch controller processes the touch data 34 and determines the location of the touch on the touch sensitive sensor or member 30.

The touch controller 53 processes the touch data 34 to produce touch information 55, and sends the touch information 55 to a control process 16. The touch information includes the touch location on the touch sensitive sensor or member 30.

The touch controller 53 also processes the touch data 34 to produce haptics request information 57 and sends the haptics request information 57 to a haptics controller 58. The haptics request information 57 includes information indicating where on the touch sensitive sensor or member 30 a touch occurred.

In order to provide contextual haptic response feedback the touch location on the touch sensitive sensor or member 30 is correlated with active areas in the interface the user is interacting with in the manner as explained in the detailed description of the invention embodiment shown in FIG. 3.

A context map 51 is stored on the haptics controller 58. The context map 51 contains the information required to generate contextual haptic decision information as explained in the detailed description of the embodiment shown in FIG. 3.

The touch location is correlated with the context map 51, which defines a number of active areas in the manner as explained in the detailed description of the embodiment shown in FIG. 3.

When the touch location has been assigned to or correlated with one active area presented to the user the required contextual haptic feedback can be provided.

The control process 16 provides haptic context information 56 to the haptics controller 58. The haptic context information is discussed in detail above in relation to the embodiment shown in FIG. 3.

The haptics controller 58 processes the haptics request information 57 using the context map 51 and determines what contextual haptic response is required in response to a touch at a location or locations on the touch sensitive sensor or member 30.

The haptics controller 58 processes the haptics request information 57 to generate haptic response information 39 that is sent to the one or more exciters or transducers 32 coupled to the touch sensitive sensor or member 30 to vibrate the touch sensitive sensor or member 30 in order to provide contextual haptic feedback response.

The haptic response information 39 is generated through the application of appropriate algorithms stored within the haptics controller as explained in the detailed description of the embodiment shown in FIG. 3.

Accordingly, haptic response information 39 can be provided to the exciters or transducers 32 in order that contextual haptic feedback can be generated without the need for the control process 16 to be used to carry out any processing. This may allow the time delay between a touch event and the provision of a contextual haptic feedback response to be reduced and/or made consistent. In some examples the time delay may be reduced to the order of 10 ms for a particular touch event.

In the above embodiment the context map 51 is stored on the haptics controller 58, and may be updated by the control process 16. Alternatively, more than one context map 51 may be stored on the haptics controller 58. Alternatively, the at least one context map 51 may be uploaded to the haptics controller 58 from the control process 16. In a further alternative the context map 51 may be replaced by another context map 51 when necessary. The at least one context map 51 may be uploaded, updated, and/or replaced under the control of a user defined application.

In the above embodiment the touch information 55 sent from the touch controller 53 to the control process 16 includes the touch location on the touch sensitive sensor or member 30. The touch location may be in the form of an absolute touch location, or may be in the form of a relative touch location or another vector. For example, the touch location may be expressed as information identifying the location of the touch location relative to a preceding touch location. Alternatively the touch information 55 may not include the touch location on the touch sensitive sensor or member 30. In this case the touch information may include information from which the touch location can be derived. The touch information may include information regarding parameters other than location data, such as gesture identification data or acceleration data.

In the above embodiment the haptics request information 57 sent from the touch controller 53 to the haptics controller 58 includes the touch location on the touch sensitive sensor or member 30. Alternatively, the haptics request information 57 may not include the touch location on the touch sensitive sensor or member 30 and the haptics controller 58 can process the haptics request information 57 to determine the touch location on the touch sensitive member 30.

In the above embodiment when the touch location can be assigned or correlated with one active area presented to the user the required contextual haptic feedback can be provided. However, there are other possibilities as explained in the detailed description of the embodiment shown in FIG. 3.

In the above embodiment haptic response information 39 is generated through the application of appropriate algorithms stored within the haptics controller 58. Alternatively, options relating to the algorithm resources are possible as explained in the detailed description of the embodiment shown in FIG. 3.

In the above embodiment the control process 16 is in communication with the haptics controller 58 to provide haptic context information 56. This will also allow the control process 16 to be able to monitor what the haptics controller 58 is doing, if desired. Further, this may allow the control process 16 to upload information to the haptics controller 58 if necessary.

Alternatively, the control process is not in communication with the haptics controller 58. In this example the haptics controller 58 will not be able to obtain haptic context information 56 from the control process 16. Accordingly, in this case the required haptic context information 56 may be stored in the haptics controller 58.

In the above embodiment the touch controller 53 is in communication with the control process 16 to provide touch information 55. Optionally, the control process 16 may also be arranged to upload information to the touch controller 53 if necessary.

The context map 51 stored on or uploaded to the haptics controller 58 may be updated or changed by the control process 16 or an active application when the layout on the touch sensitive sensor 30 changes. The latency problem in providing a haptic response does not usually apply to the same extent when updating a context map because the user is generally not awaiting or expecting the immediacy of response that is expected for a haptic response.

In general, the context map may be updated without any significant decrease in the performance of the system. Furthermore use of the context map may allow for the support of greater detail in the contextual information provided to the user, such as different threshold levels for the click response for different buttons, the selection of different haptic responses for different buttons, and the selection of different magnitudes of response for different buttons, for example.

Figure 6:
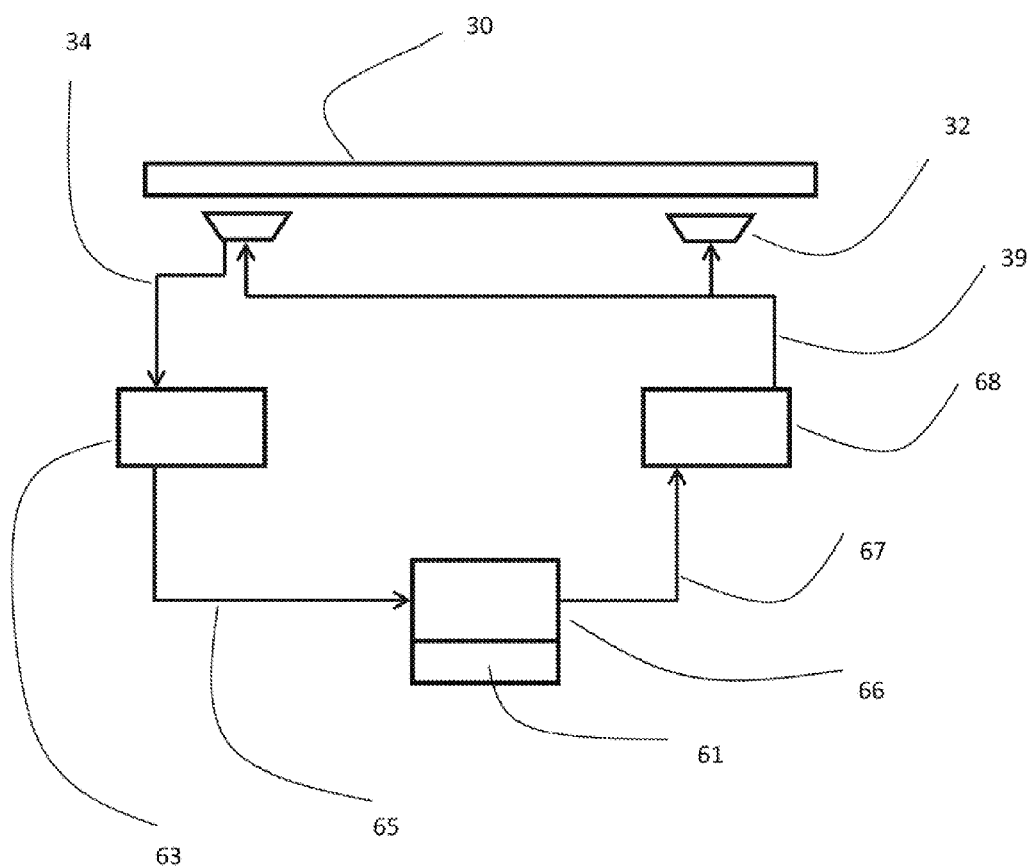
FIG. 6 shows a schematic diagram of a touch sensitive device comprising haptic feedback according to a fourth embodiment of the present invention.

FIG. 6 shows a schematic diagram of a fourth embodiment of a touch sensitive device 6 comprising haptic feedback according to the present invention. The touch sensitive device 6 comprises a touch sensitive sensor or member 30 having one or more exciters or transducers 32 coupled to it which are able to vibrate the touch sensitive sensor 30 in order to provide haptic feedback response.

A touch on the touch sensitive sensor or member 30 at a location leads to the production of touch data 34.

A touch controller 43 collects the touch data 34 from the touch sensitive sensor or member 30. The touch controller processes the touch data 34 and determines the location of the touch on the touch sensitive sensor or member 30.

The touch controller 43 processes the touch data 34 to produce touch information 45 and sends the touch information 45 to a control process 66. The touch information 45 includes the touch location on the touch sensitive sensor or member 30.

In order to provide contextual haptic response feedback the touch location on the touch sensitive sensor or member 30 is correlated with active areas in the interface the user is interacting with in the manner explained in the detailed description of the embodiment shown in FIG. 3.

A context map 61 is implemented within or uploaded to a low-level or high-priority region of the control process 66. The context map 61 contains the information required to generate contextual haptic decision information as explained in the detailed description of the embodiment shown in FIG. 3. In some examples, implementing the context map 61 at a low level within the control process 66 may require a bespoke control process 66 to be developed, such as a modified Operating System.

The touch location is correlated with the context map 61, which defines a number of active areas in the manner as explained in the detailed description of the embodiment shown in FIG. 3.

When the touch location has been assigned to or correlated with one active area presented to the user the required contextual haptic feedback can be provided.

A user defined touch/haptic application may be implemented within or above the high-level or low-priority regions of the control process if required.

If the interface presented to the user changes, for example if the user enters a new menu screen, the required context map 61 may be different to the previous context map 61 because the interface presented to the user has changed, and as a result the contextual haptic response feedback required in response to a touch on the touch sensitive sensor or member 30 at a position associated with an active area in the interface may have changed. In certain circumstances the context map 61 may need to be updated or replaced. This is carried out under the control of the control process 66. The context map 61 may be uploaded, replaced or updated through the user defined touch/haptic application 62 if and as required.

Touch information 45 is processed at a low level within the control process 66 to produce haptics request information 67, which is sent to a haptics controller 68. The haptics request information 67 includes information indicating where on the touch sensitive sensor or member 30 a touch occurred and includes information indicating what contextual haptic response is required in response to a touch at a location or locations on the touch sensitive sensor or member 30. This means that haptic response information can be provided without the need for touch information to propagate to higher levels within the control process 66, for example to user defined applications, in order to be processed to determine the required haptics request information from which haptic response information can be generated.

The haptics controller 68 processes the haptic response information 67 to generate haptic response information 39 that is sent to the one or more exciters or transducers 32 coupled to the touch sensitive sensor or member 30 to vibrate the touch sensitive sensor or member 30 in order to provide contextual haptic feedback response.

The haptic response information 39 is generated through the application of appropriate algorithms stored within the haptics controller as explained in the detailed description of the embodiment shown in FIG. 3.

Accordingly, haptic response information 39 can be provided in order that contextual haptic feedback can be generated without the need for the information needing to be passed to or processing to be carried out within high levels of the control process 66. This may allow the time delay between a touch event and the provision of a contextual haptic feedback response to be reduced. In some examples the time delay may be reduced to the order of 10 ms for a particular touch event.

The exciters or transducers 32, which may be common, may be used to couple vibrational energy to and from the touch sensitive sensor or member 30 as explained in the detailed description of the embodiment shown in FIG. 3.

In the above embodiment the context map 61 is stored in the high-priority region of the control process 66, and may be updated by the control process 66. Alternatively, more than one context map 61 may be stored in the high-priority region of the control process 66. Alternatively, the at least one context map 61 may be uploaded to the high-priority region of the control process 66 by the control process 66. In a further alternative the context map 61 may be replaced by another context map when necessary. The at least one context map 61 may be uploaded, updated, and/or replaced under the control of a user defined application.

In the above embodiment the touch information 65 sent from the touch controller 63 to the control process 66 includes the touch location on the touch sensitive sensor or member 30. Alternatively the touch information 65 may not include the touch location on the touch sensitive sensor or member 30 and the control process 66 can process the touch information 45 to determine the touch location on the touch sensitive member 30.

In the above embodiment the haptics request information 67 sent from the control process 66 to the haptics controller 68 includes the touch location on the touch sensitive sensor or member 30. Alternatively the haptics request information 67 may not include the touch location on the touch sensitive sensor or member 30 and the haptics controller 68 may process the haptics request information 67 to determine the touch location on the touch sensitive member 30.

In the above embodiment when the touch location has been assigned to or correlated with one active area presented to the user the required contextual haptic feedback can be provided. However, there are other possibilities as explained in the detailed description of the embodiment shown in FIG. 3.

In the above embodiment haptic response information 39 is generated through the application of appropriate algorithms stored within the haptics controller 68. Alternatively, options relating to the algorithm resources are possible as explained in the detailed description of the embodiment shown in FIG. 3.

In the above embodiment the control process 66 is in communication with the haptics controller 68 to provide haptics request information 67. This will also allow the control process 66 to be able to monitor what the haptics controller 68 is doing, if desired. Further, this will allow the control process 66 to upload information to the haptics controller 68 if necessary.

In the above embodiment the touch controller 43 is in communication with the control process 66 to provide touch information 45. Further, the control process 66 may be arranged to be able to upload information to the touch controller 43 if necessary.

The touch sensitive sensor or member may include an electronic visual display. Contextual haptic response feedback may include static or dynamic clicks or textures in response to a touchdown in or movement across an active area, for example.

The context map 61 stored on or uploaded to the low level within the control process 66 may be updated or changed by the control process 66 or an active application when the layout on the touch sensitive sensor 30 changes. The latency problem in providing a haptic response does not usually apply to the same extent when updating a context map because the user is generally not awaiting or expecting the immediacy of response that is expected for a haptic response. In general, the context map may be updated without any significant decrease in the performance of the system. Furthermore use of the context map may allow for the support of greater detail in the contextual information provided to the user, such as different threshold levels for the click response for different buttons, the selection of different haptic responses for different buttons, and the selection of different magnitudes of response for different buttons, for example.

Figure 7:
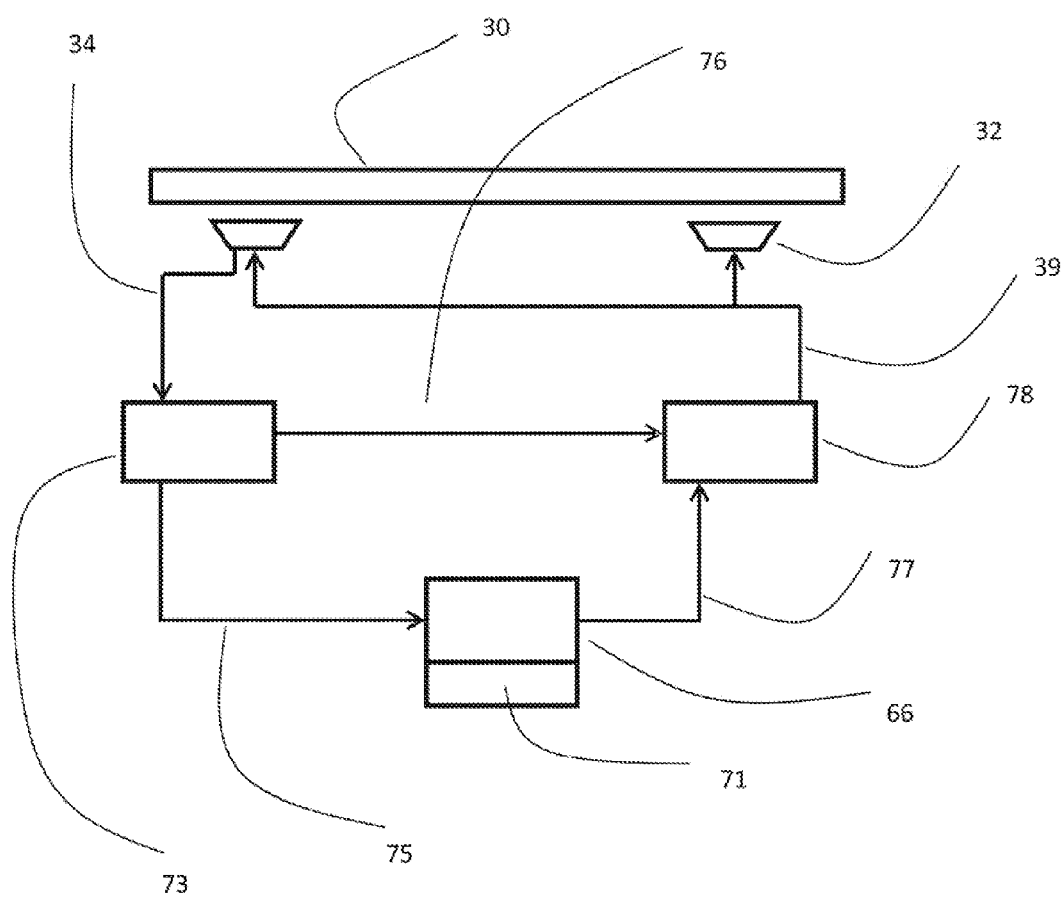
FIG. 7 shows a schematic diagram of a touch sensitive device comprising haptic feedback according to a fifth embodiment of the present invention.

FIG. 7 shows a schematic diagram of a fifth embodiment of a touch sensitive device 7 comprising haptic feedback according to the present invention. The touch sensitive device 7 comprises a touch sensitive sensor or member 30 having one or more exciters or transducers 32 coupled to it which are able to vibrate the touch sensitive sensor 30 in order to provide haptic feedback response.

A touch on the touch sensitive sensor or member 30 at a location leads to the production of touch data 34.

A touch controller 73 collects the touch data 34 from the touch sensitive sensor or member 30. The touch controller 73 processes the touch data 34 and determines the location of the touch on the touch sensitive sensor or member 30.

The touch controller 73 processes the touch data 34 to produce touch information 75 and sends the touch information 75 to a control process 66. The touch information includes the touch location on the touch sensitive sensor or member 30.

The touch controller 73 processes the touch data 34 to produce touch haptic information 76 and sends the touch haptic information 76 to a haptics controller 78.

In order to provide contextual haptic response feedback the touch location on the touch sensitive sensor or member 30 is correlated with active areas in the interface the user is interacting with in the manner as explained in the detailed description of the embodiment shown in FIG. 3.

A context map 71 is implemented within or uploaded to the high-priority region of the control process 66 in the manner as explained in the detailed description of the invention embodiment shown in FIG. 6.

The touch location is correlated with the context map 71, which defines a number of active areas in the manner as explained in the detailed description of the invention embodiment shown in FIG. 3.

When the touch location has been assigned to or correlated with one icon presented to the user the required contextual haptic feedback can be provided.

A user defined touch/haptic application may be implemented within the low-priority region of the control process 66 if required.

If the interface presented to the user changes the context map 71 may be uploaded, replaced or updated through the user defined touch/haptic application if and as required in the manner as explained in the detailed description of the embodiment shown in FIG. 6.

Touch information 75 is processed at a low level within the control process 66 and haptics request information 77 is sent to the haptics controller 78 as explained in the detailed description of the invention embodiment shown in FIG. 6 leading to corresponding benefits to those explained in the detailed description of the invention embodiment shown in FIG. 6.

The haptics controller 78 processes the haptics request information 77 to generate haptic response information 39, and sends the haptic response information 39 to the one or more exciters or transducers 32 coupled to the touch sensitive sensor or member 30 to vibrate the touch sensitive sensor or member 30 in order to provide contextual haptic feedback response.

The haptic response information 39 is generated through the application of appropriate algorithms stored within the haptics controller as explained in the detailed description of the embodiment shown in FIG. 3.

Accordingly, haptic response information 39 can be provided in order that contextual haptic feedback can be generated without the need for the information needing to be passed to or processing to be carried out within high levels of the control process 66, with benefits that may result as explained in the detailed description of the embodiment shown in FIG. 6.

Optionally, upon receiving touch haptic information 76 from the touch controller 73 the haptics controller 78 starts the process of obtaining or generating the appropriate resources so that these are stored within the haptics controller 78 ready to generate haptic response information 39. As a result, when the haptics controller 78 receives the haptics request information 77 from the control process 66, the haptics controller 78 is already primed to provide haptic response information 39. When the haptics request information 77 is received the haptics controller 78 may have completed preparing the appropriate resources, or at least be some way through the process required to prepare the appropriate resources. This may lead to a reduction in the time required for the haptics controller 78 to generate haptic response information 39. In some examples, after receiving touch haptic information 76 the haptics controller 78 may have to start to prepare more resources than will actually be required when the haptics controller 78 subsequently receives haptics request information 77.

In the above embodiment the context map 71 is stored in the high-priority region of the control process 66, and may be updated by the control process 66. Alternatively, options relating to the context map 71 are possible as explained in the detailed description of the invention shown in FIG. 6.

In the above embodiment the touch information 75 sent from the touch controller 73 to the control process 66 includes the touch location on the touch sensitive sensor or member 30. Alternatively the touch information 75 may not include the touch location on the touch sensitive sensor or member 30.

In the above embodiment the touch haptic information 76 sent from the touch controller 73 to the haptics controller 78 includes the touch location on the touch sensitive sensor or member 30. Alternatively the touch haptic information 76 may not include the touch location on the touch sensitive sensor or member 30.

In the above embodiment the haptics request information 77 sent from the control process to the haptics controller 78 includes the touch location on the touch sensitive sensor or member 30. Alternatively the haptics request information 67 may not include the touch location on the touch sensitive sensor or member 30. In this case the haptics controller 78 may process the haptics request information 77 to determine the touch location on the touch sensitive member 30. Alternatively the haptics controller 78 may process the touch haptic information 76 to determine the touch location on the touch sensitive member 30.

In the above embodiment when the touch location has been assigned to or correlated with one active area presented to the user the required contextual haptic feedback can be provided. However, there are other possibilities as explained in the detailed description of the embodiment shown in FIG. 3.

In the above embodiment haptic response information 39 is generated through the application of appropriate algorithms stored within the haptics controller 78. Alternatively, options relating to the algorithm resources are possible as explained in the detailed description of the invention embodiment shown in FIG. 3.

In the above embodiment the control process 66 is in communication with the haptics controller 78 to provide haptics request information 77. This will also allow the control process 66 to be able to monitor what the haptics controller 78 is doing, if desired. Further, this will allow the control process 66 to upload information to the haptics controller 78 if necessary.

In the above embodiment the touch controller 73 is in communication with the control process 66 to provide touch information 75. Further, the control process 66 may be arranged to be able to upload information to the touch controller 73 if necessary.

Contextual haptic response feedback may include static or dynamic clicks or textures in response to a touchdown in or movement across an active area, for example.

The context map 71 stored on or uploaded to the low level within the control process 66 may be updated or changed by the control process 66 or an active application when the layout on the touch sensitive sensor 30 changes. The latency problem in providing a haptic response does not usually apply to the same extent when updating a context map because the user is generally not awaiting or expecting the immediacy of response that is expected for a haptic response. In general, the context map may be updated without any significant decrease in the performance of the system. Furthermore use of the context map may allow for the support of greater detail in the contextual information provided to the user, such as different threshold levels for the click response for different buttons, the selection of different haptic responses for different buttons, and the selection of different magnitudes of response for different buttons, for example.

Figure 8:
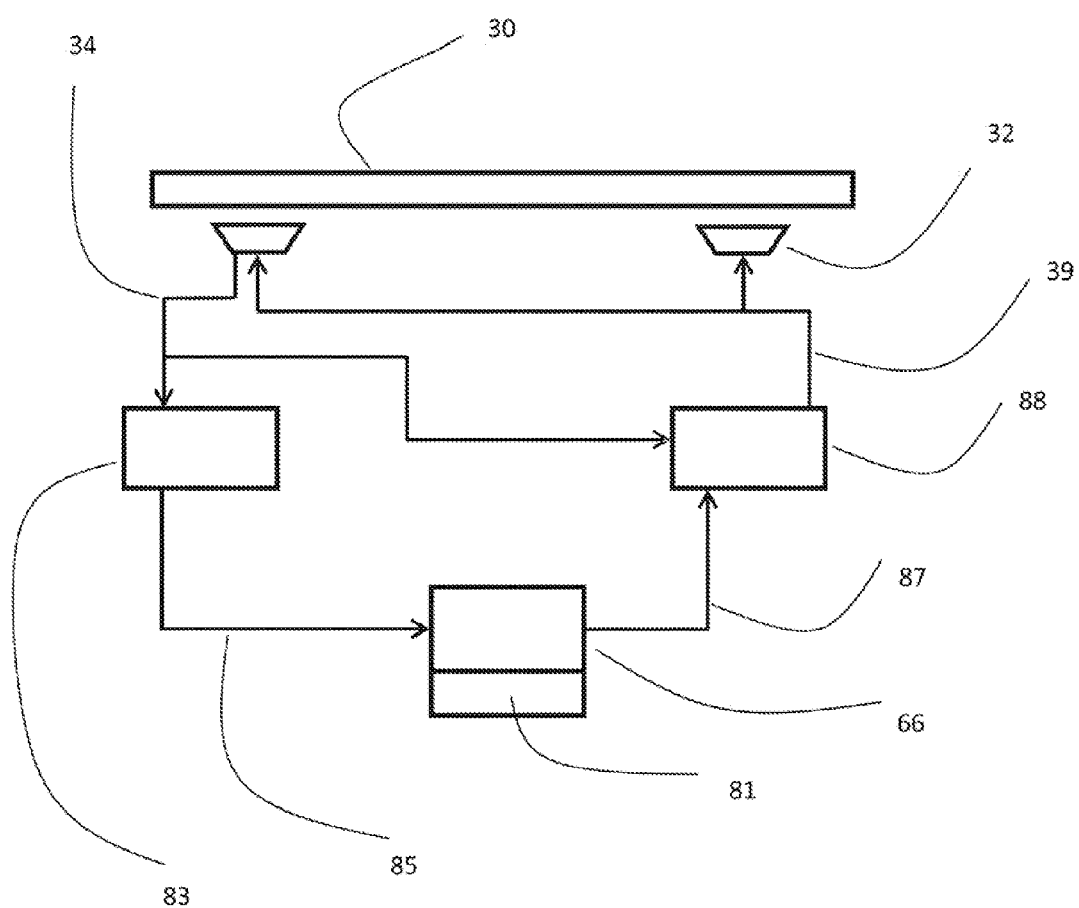
FIG. 8 shows a schematic diagram of a touch sensitive device comprising haptic feedback according to a sixth embodiment of the present invention.

FIG. 8 shows a schematic diagram of a sixth embodiment of a touch sensitive device 8 comprising haptic feedback according to the present invention. The touch sensitive device 8 comprises a touch sensitive sensor or member 30 having one or more exciters or transducers 32 coupled to it which are able to vibrate the touch sensitive sensor 30 in order to provide haptic feedback response.

A touch on the touch sensitive sensor or member 30 at a location leads to the production of touch data 34.

A touch controller 83 collects the touch data 34 from the touch sensitive sensor or member 30. The touch controller 83 processes the touch data 34 and determines the location of the touch on the touch sensitive sensor or member 30.

The touch controller 83 processes the touch data 34 to produce touch information 85, and sends the touch information 85 to a control process 66. The touch information 85 includes the touch location on the touch sensitive sensor or member 30.

The haptics controller 88 also collects the touch data 34 from the touch sensitive sensor or member 30.

In order to provide contextual haptic response feedback the touch location on the touch sensitive sensor or member 30 is correlated with active areas in the interface the user is interacting with in the manner as explained in the detailed description of the embodiment shown in FIG. 3.

A context map 81 is implemented within or uploaded to the high-priority region of the control process 66 in the manner as explained in the detailed description of the embodiment shown in FIG. 6.

The touch location is correlated with the context map 81, which defines a number of active areas in the manner as explained in the detailed description of the embodiment shown in FIG. 3.

When the touch location has been assigned to or correlated with one active area presented to the user the required contextual haptic feedback can be provided.

A user defined touch/haptic application may be implemented within the low-priority region of the control process 66 if required.

If the interface presented to the user changes the context map 81 may be uploaded, replaced or updated through the user defined touch/haptic application if and as required in the manner as explained in the detailed description of the embodiment shown in FIG. 6.

The control process 66 processes the touch information 85 to generate haptics request information 87, and the haptics request information 87 is sent to the haptics controller 88, as explained in the detailed description of the embodiment shown in FIG. 6 leading to benefits corresponding to those explained in the detailed description of the embodiment shown in FIG. 6.

The haptics controller 88 processes the haptics request information 87 to generate haptic response information 39 that is sent to the one or more exciters or transducers 32 coupled to the touch sensitive sensor or member 30 to vibrate the touch sensitive sensor or member 30 in order to provide contextual haptic feedback response.

The haptic response information 39 is generated through the application of appropriate algorithms stored within the haptics controller 88 as explained in the detailed description of the embodiment shown in FIG. 3.

Accordingly, haptic response information 39 can be provided in order that contextual haptic feedback can be generated without the need for the information needing to be passed to or processing to be carried out within high levels of the control process 66, with benefits that may result as explained in the detailed description of the embodiment shown in FIG. 6.

Optionally, upon receiving touch data 34 the haptics controller 88 starts the process of obtaining or generating the appropriate algorithm resources so that these are stored within the haptics controller 88 ready to generate haptic response information 39, with the benefits that may results as explained in the detailed description of the embodiment shown in FIG. 7.

In the above embodiment the context map 81 is stored in the high-priority region of the control process 66, and may be updated by the control process 66. Alternatively, options relating to the context map are possible as explained in the detailed description of the embodiment shown in FIG. 6.

In the above embodiment the touch information 85 sent from the touch controller 83 to the control process 66 includes the touch location on the touch sensitive sensor or member 30. Alternatively the touch information 85 may not include the touch location on the touch sensitive sensor or member 30.

In the above embodiment the haptics request information 87 sent from the control process to the haptics controller 88 includes the touch location on the touch sensitive sensor or member 30. Alternatively the haptics request information 87 may not include the touch location on the touch sensitive sensor or member 30. In this example the haptics controller 88 may process the haptics request information 87 to determine the touch location on the touch sensitive member 30.

Alternatively the haptics controller 88 may process the touch data 34 to determine the touch location on the touch sensitive member 30.

In the above embodiment when the touch location has been assigned to or correlated with one active area presented to the user the required contextual haptic feedback can be provided. However, there are other possibilities as explained in the detailed description of the embodiment shown in FIG. 3.

In the above embodiment haptic response information 39 is generated through the application of appropriate algorithms stored within the haptics controller 88. Alternatively, options relating to the algorithm resources are possible as explained in the detailed description of the embodiment shown in FIG. 3.

In the above embodiment the control process 66 is in communication with the haptics controller 88 to provide haptics request information 87. This may also allow the control process 66 to be able to monitor what the haptics controller 88 is doing, if desired. Further, this may allow the control process 66 to upload information to the haptics controller 88 if necessary.

In the above embodiment the touch controller 83 is in communication with the control process 66 to provide touch information 85. Further, this may allow the control process 66 to upload information to the touch controller 83 if necessary.

Contextual haptic response feedback may include static or dynamic clicks or textures in response to a touchdown in or movement across an active area, for example.

The context map 81 stored on or uploaded to the low level within the control process 66 may be updated or changed by the control process 66 or an active application when the layout on the touch sensitive sensor 30 changes. The latency problem in providing a haptic response does not usually apply to the same extent when updating a context map because the user is generally not awaiting or expecting the immediacy of response that is expected for a haptic response. In general, the context map may be updated without any significant decrease in the performance of the system. Furthermore use of the context map may allow for the support of greater detail in the contextual information provided to the user, such as different threshold levels for the click response for different buttons, the selection of different haptic responses for different buttons, and the selection of different magnitudes of response for different buttons, for example.

In the embodiments described above the touch information is sent directly from the touch controller to the control process, and may also sent directly from the touch controller to the haptics controller. In alternative arrangements the touch information may be sent from the touch controller to the control process, and then sent from the control process to the haptics controller. In alternative arrangements the touch information may be sent from the touch controller to the haptics controller, and then sent from the haptics controller to the control process.

In the above embodiments the touch controller and haptics controller are separate devices. Alternatively, the touch controller and haptics controller may be combined within a single device. Alternatively the touch controller or haptics controller or both may be implemented in software or as peripheral devices on the central processor.

Figure 9:
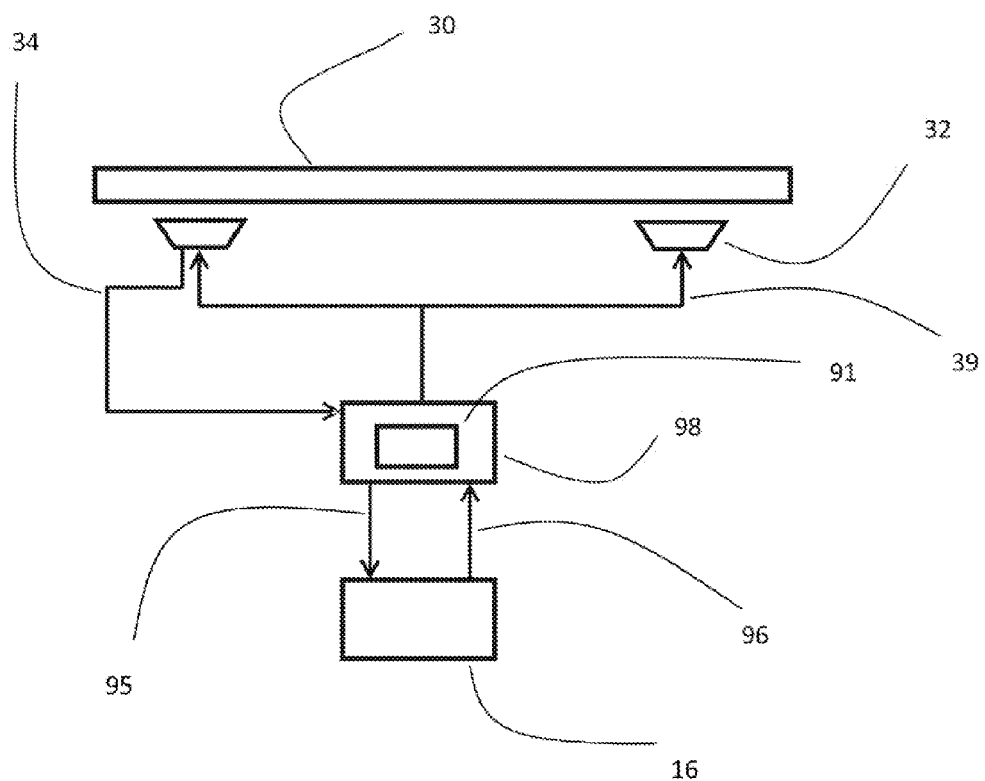
FIG. 9 shows a schematic diagram of a touch sensitive device comprising haptic feedback according to a seventh embodiment of the present invention.

FIG. 9 shows a schematic diagram of a seventh embodiment of a touch sensitive device 9 comprising haptic feedback according to the present invention and having a touch controller and haptics controller may be combined within a single device. The touch sensitive device 9 comprises a touch sensitive sensor or member 30 having one or more exciters or transducers 32 coupled to it which are able to vibrate the touch sensitive sensor 30 in order to provide haptic feedback response.

A touch on the touch sensitive sensor or member 30 at a location leads to the production of touch data 34.

A combined touch and haptics controller 98 collects the touch data 34 from the touch sensitive sensor or member 30. The combined touch and haptics controller 98 processes the touch data 34 and determines the location of the touch on the touch sensitive sensor or member 30.

The combined touch and haptics controller 98 also processes the touch data 34 to produce touch information 95, and sends the touch information 95 to a control process 16. The touch information 95 includes the touch location on the touch sensitive sensor or member 30.

In order to provide contextual haptic response feedback the touch location on the touch sensitive sensor or member 30 is correlated with active areas in the interface the user is interacting with in the manner as explained in the detailed description of the embodiment shown in FIG. 3.

A context map 91 is stored on the combined touch haptics controller 98. The context map 91 contains the information required to generate contextual haptic decision information as explained in the detailed description of the embodiment shown in FIG. 3.

The touch location is correlated with the context map 91, which defines a number of active areas in the manner as explained in the detailed description of the embodiment shown in FIG. 3.

When the touch location has been assigned to or correlated with one active area presented to the user the required contextual haptic feedback can be provided.

The control process 16 provides haptic context information 96 to the combined touch and haptics controller 98. What this haptic context information 96 constitutes and why it may need to be sent is explained in the detailed description of the embodiment shown in FIG. 3.

The combined touch and haptics controller 98 processes the touch data 34 and determines what contextual haptic response is required in response to a touch at a location or locations on the touch sensitive sensor or member 30.

The combined touch and haptics controller 98 processes the touch data 34 to generate haptic response information 39 that is sent to the one or more exciters or transducers 32 coupled to the touch sensitive sensor or member 30 to vibrate the touch sensitive sensor or member 30 in order to provide contextual haptic feedback response.

The haptic response information 39 is generated through the application of appropriate algorithms stored within the combined touch and haptics controller 98 as explained in the detailed description of the embodiment shown in FIG. 3.

Accordingly, haptic response information 39 can be provided in order that contextual haptic feedback can be generated without the need for the control process 16 to be used to carry out any processing. This may allow the time delay between a touch event and the provision of a contextual haptic feedback response to be reduced, and/or made consistent. In some examples the time delay may be reduced to be of the order of 10 ms for a particular touch event.

In the above embodiment the context map 91 is stored on the combined touch and haptics controller 98, and may be updated by the control process 16. Alternatively, more than one context map 91 may be stored on the combined touch and haptics controller 98. Alternatively, the at least one context map 91 may be uploaded to the combined touch and haptics controller 98 from the control process 16. In a further alternative the context map 91 may be replaced by another context map 91 when necessary. The at least one context map 91 may be uploaded, updated, and/or replaced under the control of a user defined application.

In the above embodiment the touch information 95 sent from the combined touch and haptics controller 98 to the control process 16 includes the touch location on the touch sensitive sensor or member 30. Alternatively the touch information 95 may not include the touch location on the touch sensitive sensor or member 30.

In the above embodiment when the touch location can be assigned or correlated with one active area presented to the user the required contextual haptic feedback can be provided. However, there are other possibilities as explained in the detailed description of the invention shown in FIG. 3.

In the above embodiment haptic response information 39 is generated through the application of appropriate algorithms stored within the combined touch and haptics controller 98. Alternatively, other options are possible as explained in the detailed description of the embodiment shown in FIG. 3.

In the above embodiment the control process 16 is in communication with the combined touch and haptics controller 98 to provide haptic context information 96. This will also allow the control process 16 to be able to monitor what the combined touch and haptics controller 98 is doing, if desired. Further, this will allow the control process 16 to upload information to the combined touch and haptics controller 98 if necessary. Alternatively, the control process 16 is not in communication with the combined touch and haptics controller 98.

Contextual haptic response feedback may include static or dynamic clicks or textures in response to a touchdown in or movement across an active area, for example.

The context map 91 stored on the touch/haptics controller 98 may be updated or changed by the control process 16 or an active application when the layout on the touch sensitive sensor 30 changes. The latency problem in providing a haptic response does not usually apply to the same extent when updating a context map because the user is generally not awaiting or expecting the immediacy of response that is expected for a haptic response. In general, the context map may be updated without any significant decrease in the performance of the system. Furthermore use of the context map may allow for the support of greater detail in the contextual information provided to the user, such as different threshold levels for the click response for different buttons, the selection of different haptic responses for different buttons, and the selection of different magnitudes of response for different buttons, for example.

The problem associated with prior art touch sensitive devices with regards to excessive, variable and inconsistent time delays in the provision of haptic response feedback may be solved by the above embodiments of the touch sensitive device shown in FIGS. 3-9. This is because haptic response feedback may be provided in a short and reproducible time after a touch on the touch sensitive sensor. The magnitude of this time may be less than for a prior art system using a normal control process to produce haptic decision information leading to the generation of haptic response feedback, where use of a normal control process may also lead to excessive delay and variability in the time between the touch and the provision of haptic response feedback.

The problem associated with the prior art applying the same haptic response to a touch screen may be solved by the above embodiments of the touch sensitive device shown in FIGS. 3-9. This is because a required haptic response may be provided, in terms of characteristics that may include: location; spatial extent and profile; amplitude; time delay from the touch event; and temporal duration and profile.

The problem associated with the prior art with the haptic response being disconnected with what is presented on the touch sensitive screen and what is happening in the control process may be solved by the above embodiments of the touch sensitive device shown in FIGS. 3-9. This is because the control process may have: knowledge of what is presented on the touch sensitive sensor; knowledge of the touch event; and knowledge of the required haptic response sent to the touch sensitive sensor.

Because the control process is not used to process information required to provide haptic response feedback, or only a low level within the control process needs to undertake any processing, haptic response feedback may be provided when the control process is asleep or when higher levels within the control process are asleep. Here 'asleep' includes the control process undertaking operations that may preclude it from undertaking the generation of haptic response information within a prior art touch sensitive device.

In some examples the control process may be provided on a central processor or primary processor, and the context map may be processed in a touch controller or a haptics controller or a touch/haptics controller provided on a peripheral processor or processors, or a secondary processor or processors.

In some examples the control process may be provided by software executed on a central processor, the touch controller or haptics controller or touch/haptics controller may also be provided by software executing on the central processor, and the context map may be provided by a peripheral device of the central processor.

In some examples the control process may be provided in a touch input device by electrical circuits producing a digital or analogue output in response to touch input. In some examples the touch input device may be a peripheral device such as a keypad or a keyboard. In these examples the electrical circuits providing the control process may have little, or no, processing capacity.

In the embodiments discussed above, in addition to the exciters or transducers used to provide contextual feedback as discussed above, further transducers or exciters may be coupled or mounted to the touch sensitive sensor or member 30 for other reasons, but which play no part in providing contextual haptic feedback.

In the embodiments discussed above, a touch on the touch sensitive sensor or member 30 leads to the production of touch data 34. This process may be conducted through the use of various touch sensing methods including, but not limited to: resistive touch sensing, capacitive touch sensing including surface, projected, mutual and self-capacitance, infrared touch sensing, acoustic pulse recognition, surface acoustic wave vibration sensing, bending wave vibration sensing or Dispersive Signal Technology.

In the embodiments discussed above, the touch location is correlated with the context map 31 defining a number of active areas. This may take a variety of forms, such as a collection of vectors describing geometrical shapes such as rectangles or ellipses. In another example the context map may be stored as a Boolean bit map with one bit per pixel, or some other metric. Each active area in the interface presented to the user may correspond with a number of pixels in the context map. It is then straightforward to correlate the touch location with the touch location corresponding to an area presented to the user.

In the embodiments discussed above, data transmission between systems of the touch sensitive device such as between the control process, the touch controller and the haptics controller, may be by Serial Peripheral Interface (SPI), Inter-Integrated Circuit (I²C), and Universal asynchronous Receiver/Transmitter (UART) data links or other suitable data communication protocols and systems known in the art.

In the embodiments discussed above, the touch sensitive sensor may include an electronic visual display.

In the embodiments discussed above, the touch sensitive sensor or member may contain touch responsive features that are updatable. The touch sensitive sensor or member may contain touch responsive features that are not updatable.

The term "actuator" 32 may include but is not limited to technologies such as magnetic moving coil, moving magnet, balanced armature, eccentric rotating motor, shape memory alloy, electro-active polymer, piezoceramic, magnetostrictive, electret, other electromechanical transducer or any combination thereof.

In the embodiments discussed above the context map be stored or uploaded to a touch controller, a haptics controller or a combined touch and haptics controller. It will be clear to the person skilled in the art that the context map may also be stored or uploaded to another external device that may be in communication with the control process and may be in communication with any or all of the touch controller, a haptics controller or a combined touch and haptics controller.

In the embodiments discussed above the context map may be uploaded, updated, or replaced by the control process. It will be clear to a person skilled in the art that an active application may be used instead of the control process for these purposes.

In the embodiments discussed above and shown in FIGS. 3 to 9, arrows between the components within the figures show a direction. The arrows having a direction is only being used to aid in explaining the embodiment of the invention, and does not mean that there may not be a communication or data route in the opposite direction to the arrow between the two components of the touch sensitive device connected by the arrow.

In the embodiments discussed above the control process represents the main control software of the system. In some examples the control process may take the form of an Operating System, embedded firmware in a microcontroller, or any other appropriate system known in the art.

The features disclosed in the different embodiments discussed above and the alternatives are not exclusive. This means that features in any or all of the embodiments and alternatives may be exchanged and/or combined if desired.

The apparatus described above may be implemented at least in part in software. Those skilled in the art will appreciate that the apparatus described above may be implemented using general purpose computer equipment or using bespoke equipment. The hardware elements, operating systems and programming languages of such computers are conventional in nature, and it is presumed that those skilled in the art are adequately familiar therewith.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A touch sensitive device for generating contextual haptic feedback, the device comprising:
   a touch sensitive member;
   at least one transducer mounted to the member to provide vibrational energy to the member to provide haptic feedback;
   a processor comprising a control process in the form of a main control process of the touch sensitive device; and
   a context map that contains information required to generate contextual haptic decision information,
   wherein the context map is stored on a touch controller, a haptics controller, a combined touch and haptics controller or another device external to the processor in communication with the processor, and
   wherein the touch sensitive device is adapted to use the context map to enable signals to be provided to the at least one transducer in response to touch of the touch sensitive device, whereby the at least one transducer can couple vibrational energy to the touch sensitive member to provide contextual haptic feedback.

2. A touch sensitive device according to claim 1, wherein the contextual haptic feedback is provided without the main control process being used.

3. A touch sensitive device according to claim 1, wherein the main control process comprises an operating system or embedded firmware in a microcontroller.

4. A touch sensitive device according claim 1, wherein the touch controller, or haptics controller, or combined touch and haptics controller or the another device is adapted to receive context information from the control process.

5. A touch sensitive device according to claim 4, wherein said context information comprises the context map and/or updates to the context map, and/or replacements for the context map.

6. A touch sensitive device according to claim 4, wherein the control process is adapted to upload the context map to the touch controller, haptics controller, combined touch and haptics controller or the another device.

7. A touch sensitive device according claim 1, wherein the touch controller, haptics controller, combined touch and haptics controller or the another device is adapted to receive touch data from the touch sensitive member and to send touch information to the control process.

8. A touch sensitive device according to claim 7, wherein the touch information comprises a touch position on the touch sensitive member.

9. A touch sensitive device according to claim 1, wherein the touch controller, haptics controller, combined touch and haptics controller or the another device is adapted to calculate the signals to be applied to the or each transducer by applying appropriate algorithms.

10. A touch sensitive device according to claim 1, wherein the context map comprises a pixel map.

11. A touch sensitive device according to claim 1, wherein the context map is stored as a collection of vectors representing geometrical shapes.

* * * * *